United States Patent [19]
Hock

[11] 3,891,321
[45] June 24, 1975

[54] OPTICAL METHOD AND APPARATUS FOR MEASURING THE RELATIVE DISPLACEMENT OF A DIFFRACTION GRID

[75] Inventor: Fromund Hock, Wetzlar, Germany
[73] Assignee: Ernst Leitz GmbH, Wetzlar, Germany
[22] Filed: Aug. 20, 1973
[21] Appl. No.: 389,713

[30] Foreign Application Priority Data
Aug. 21, 1972 Germany............................ 2240968

[52] U.S. Cl. ............. 356/111; 356/169; 250/237 G
[51] Int. Cl. ............................................ G01b 9/02
[58] Field of Search ........... 356/106, 111, 114, 169, 356/237 G

[56] References Cited
UNITED STATES PATENTS
3,630,622  12/1971  de Lang ............................... 356/114
3,656,853  4/1972   Bagley et al. ........................ 356/106
3,726,595  4/1973   Matsumoto ........................... 356/111

Primary Examiner—Ronald L. Wibert
Assistant Examiner—Conrad Clark
Attorney, Agent, or Firm—Gilbert L. Wells

[57] ABSTRACT

Optical means for measuring the relative displacement of a one- or two-dimensional diffraction grating in its plane of division along one or two coordinate directions, with illumination of the grating by a light flux in a defined solid angle zone which is smaller than the corresponding angles of diffraction of the grating, and with interference- evaluation of two or more partial light fluxes diffracted on the grating, wherein:

a. with the use of an illuminating beam with two approximately equally intensive polarization components, which are polarized complementarily to each other and have differing light frequency, an electric reference signal is produced which is phase-correlated to the difference signal of these components; that b. the illuminating ray beam is divided, by means of an optical component, into at least two mutually inclined partial beams, that then, by means of a further optical component, at least two partial beams are combined into at least one pair of parallel partial beams consisting of mutually complementary partial waves having different optical destinations wherein the diffraction grating is used as the dividing or combining component; that c. from each pair of parallel, recombined, complementarily polarized partial beams of different frequency, the difference frequency, modulated by a displacement of the grating in accordance with phase and frequency, between the complementary partial beams is formed as the measuring signal by means of photoelectric transducers, after the pair of partial beams has passed through a polarization analyzer with preferably two outputs; and that d. the reference signal and the measuring signal are compared with each other in an electric comparison device, wherein the relative phase of the two signals is measured as a yardstick for the respective displacement component of the grating, and that the number of beats is stored with the correct arithmetic sign in accordance with the sign of the difference frequency.

20 Claims, 5 Drawing Figures

OPTICAL METHOD AND APPARATUS FOR MEASURING THE RELATIVE DISPLACEMENT OF A DIFFRACTION GRID

CROSS REFERENCES TO RELATED APPLICATIONS

The disclosure of the copending application of the present inventor entitled "Method and Apparatus for the Automatic Photoelectric Trapping of Local Changes of Optically Effective Object Structures" Ser. No. 389,792 filed Aug. 20, 1973 now U.S. Pat. No. 3,833,302 incorporated herein.

In addition, the disclosure of the application of Fromund Ser. No. 383,780 Hock et al, filed July 30, 1973 and having the title "Method and Apparatus for the No-Contact Measurement of Velocities, Changes in Relative Position, or Displacement Paths" is incorporated herein.

Applicant incorporates by reference his copending application Ser. No. 258,297 filed May 31, 1972 now U.S. Pat. No. 3,822,942, which shows the state of the art of two-beam interferometers using a laser beam.

BACKGROUND OF THE INVENTION

The present invention relates to optical means for the measurement of the relative displacement of a one-or two-dimensional diffraction grating in its plane of division along one or two coordinate directions, with illumination of the grating by a light flux in a defined solid angle zone which is smaller than the corresponding angles of diffraction of the grating, and with evaluation of the partial light fluxes diffracted on the grating.

As known, the interferometric methods used in optics yield length or angular measurements of high quality. In the twobeam interferometers corresponding to the arrangements of Michelson, Mach-Zehnder, Sagnac, or also to grating interference arrangements, the change in path difference and/or phase shift between the two partial beams, connected with the respective measuring step, does not yet yield any information regarding the arithmetic sign of the corresponding change in the measured variable. This information can additionally be obtained and evaluated from the viewpoint of measurement technology by various conventional methods and devices. These measuring methods are based on the realization, in principle, that phase-shifted linked periodic signals derived from the interference phenomena represent an electric rotating field having a sense of direction. In this method, the relative changes between the interfering partial beams, constituting the measuring information, can be produced by other than different optical path lengths of the partial beams. By moving the component utilized for the beam division at right angles to the arriving ray in a direction included in a plane which also contains at least two partial beams split off from the illuminating ray, then exiting partial beams are provided, upon orthogonality between the divided surface and the illuminating ray, with an oppositely symmetrical, velocity-proportional Doppler shift of their light frequency, and thus a corresponding variation velocity of their phase differences with respect to each other.

Disadvantages encountered in such measuring methods are, on the one hand, the amplitude dependency of the measuring results and, on the other hand, the associated drift problems in the amplifiers and photoelectric receivers employed.

SUMMARY OF THE INVENTION

Therefore, having in mind the limitations of the prior art, the present invention is based on the object to provide a method, as well as devices for conducting same, which avoid the above-described disadvantages and simultaneously have only the minor relative measuring uncertainties known from incremental measuring systems operating with photoelectric signals which vary continuously and periodically with position.

This object is attained by means of a method of the type indicated hereinabove, which is distinguished in that, with the use of an illuminating beam with two approximately equally intensive polarization components, which are polarized complementarily to each other and have a differing light frequency, an electric reference signal is produced which is phase-correlated to the difference signal of these components; that the illuminating ray beam is divided, by means of an optical component, into at least two mutually inclined partial beams; that then, by means of a further optical component, at least two partial beams are combined into at least one pair of parallel partial beams consisting of mutually complementary partial waves having different optical destinations, wherein the diffraction grating is used as the dividing or combining component; that, from each pair of parallel, recombined, complementarily polarized partial beams of different frequency, the difference frequency, modulated by a displacement of the grating in accordance with phase and frequency, between the complementary partial beams is formed as the measuring signal by means of photoelectric transducers, after the pair of partial beams has passed through a polarization analyzer with preferably two outputs; and that the reference signal and the measuring signal are compared with each other in an electric comparison device, wherein the relative phase of the two signals is measured as a yardstick for the respective displacement component of the grating; and that the number of beats is stored with the correct arithmetic sign in accordance with the sign of the difference frequency. In the procedure of the present invention, it is possible to produce a phase shift between these partial beams of the measuring beam path, in addition to the frequency and/or phase differences produced between these partial beams by the displacement of the measuring grating, prior to or after the combination of the beams, by means of mechanical-optical, electromechanical-optical, or electrooptical components, in a control or driving circuit. It is also possible to produce, with the aid of a rotating polarizer, an illuminating beam having a rotating linear polarization direction, consisting of complementary, circularly polarized partial waves having a difference frequency equal to twice the frequency of rotation of the polarizer.

Devices for conducting the novel process are constructed so that a light source producing an illuminating ray beam with two approximately equally intensive polarization components, which are polarized complementary to each other and exhibit differing light frequencies, is associated with a reference stage producing an electric signal phase-correlated with the difference signal of these components; that furthermore there are provided in the path of the illuminating beam an optical component for dividing the illuminating beam into two mutually inclined partial beams, as well as a further optical component for combining at least two partial beams to at least one pair of parallel partial beams consisting of mutually complementary partial waves having different optical destinations, wherein one of these optical components is the diffraction grating which can be displaced relative to the beam path; that subsequently in the beam path a polarization analyzer is disposed with preferably two outputs, this analyzer being associated with photoelectric transducers; and that the photoelectric transducers are associated with an electric comparison unit, as well as optionally an indicating stage and/or a storage means and/or a servo circuit. In this connection, the light source can be a laser with a polarization-isotropic resonator, oscillating in its single axial mode, the mode of oscillation of which is split up by an axial magnetic field into two frequency-shifted, complementary circularly polarized partial waves of the same direction. It is also possible to provide as the light source a laser having a polarization-isotropic resonator, which is dimensioned so that only two axial, mutually vertically polarized oscillation modes of differing frequencies contribute toward the light generation. Advantageously, a mechanical-optical, electromechanical-optical, or electrooptical component, which changes the phase relationship between the partial beams, is additionally provided in the beam path. The grating employed can be constructed as a phase grid so that it deflects, with preferred intensities, light only into respectively two coplanar orders of diffraction. The components effecting the directional changes, associated with the measuring grating, can be polarizing elements, such as Wollaston prisms, analogous, double-refracting pairs of transversely slideable lenses, or dielectric reflective surfaces separating linear polarization components. Finally, it is possible to design the components associated with the measuring grating and effecting the directional changes as polarization-neutral elements, such as phase or amplitude grids, or as partially transmissive mirrors.

A special advantage of the novel method as compared to the prior art resides in that the processing of the signal can be accomplished in a frequency range ensuring only mirror additional noise effects.

BRIEF DESCRIPTION OF THE DRAWINGS

Embodiments of devices for conducting the novel method of the present invention are illustrated schematically in the drawings and are described hereinbelow, to wit.

DESCRIPTION OF THE PREFERRED EMBODIMENTS

Figure 1:
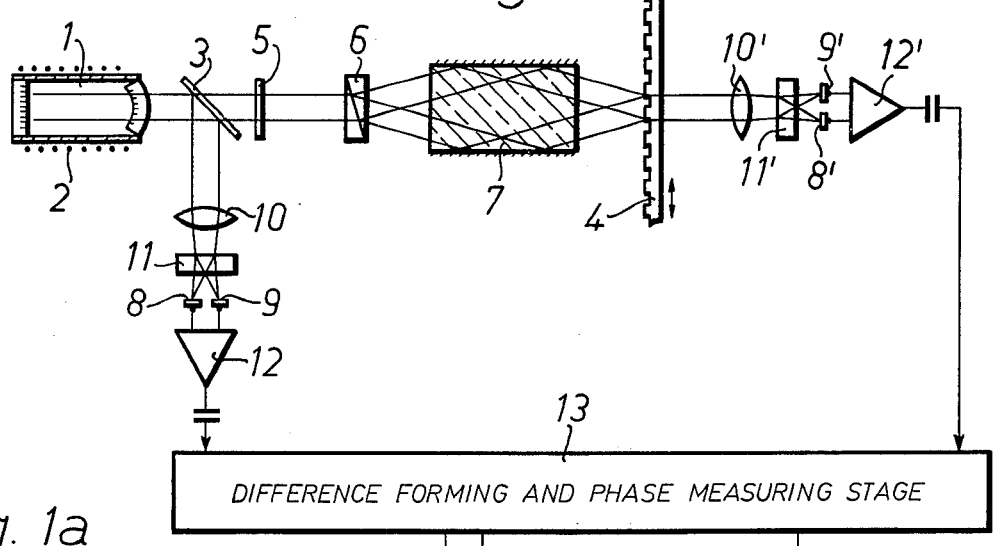
FIG. 1 shows a device for measuring in one coordinate direction with a reflecting, beam-combining component.

In FIG. 1, a polarization-neutral splitter 3 is connected after a two-frequency laser 1 surrounded by a magnetic device 2 producing a magnetic field disposed coaxially to the resonator. The laser can be, for example, a helium-neon gas laser having a polarization-isotropic resonator, yielding in the space free of the magnetic field only one light frequency in the $TEM_{001}$ mode and radiating linearly polarized light. U.S. Pat. No. 3,694,768 of Young et al which issued Sept. 26, 1972 discloses the state of the art of $TEM_{001}$ mode lasers. As has been demonstrated in J. Appl. Phys., Vol. 33, pages 2319–2321, (1962), by Statz Paananen and Kosterer, the polarization plane of the laser begins to rotate with a frequency proportional to the field strength upon the excitation by the device 2 of a magnetic field coaxial to the resonator.

Figure 1A:
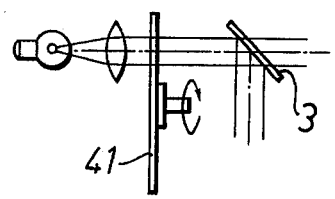
FIG. 1a is a detailed showing of a rotating polarizer useful with the device of FIG. 1.

This rotating linear polarization can also be described by a pair of equally strong waves circularly polarized toward the right and toward the left, with a light frequency difference corresponding to twice the rotation frequency, so that also a light source with a natural or simple circular polarization having an associated, constantly or oscillatingly rotating linear polarizer 41 would produce the type of light wave corresponding to the concept of the present invention as shown in FIG. 1a.

One of the partial beams produced at the splitter 3 is directed to a Wollaston prism 6 via a quarter-wave plate 5; the prism is followed by a reflective component 7, e.g. a glass block, and a phase grid 4. Respectively one collector optic 10', a double-refractive plate 11' inclined with its axis by 45° with respect to the splitting direction of the Wollaston prism 6, and respectively one photoelectric receiver pair 8', 9', are associated with the grid 4. This pair of receivers is connected to the input terminals of a differential amplifier 12', the output signals of which are fed to a difference-forming and phase-measuring stage 13, the circuitry of which is disclosed in Frequenz, Vol. 17 (1963) No. 4, p. 133. A foward-backward counter 14, the circuitry of which is disclosed in VRZ 1, manufactured by Ernst Leitz GmbH., Wetzlar, F.R. Germany, as well as a beat fraction indicator 15, the circuitry of which is disclosed in Frequenz, Vol. 17 (1963) No. 4, p. 133, follow the stage 13.

The device described thus far functions as follows: The laser 1 produces a first component circularly polarized toward the right and a second component circularly polarized toward the left, the frequency difference of which is controllable by the magnetic field generated by the device 2. These components are combined to a linearly polarized beam, the plane of polarization of which rotates at a difference frequency corresponding to the frequency difference.

The polarization-neutral splitter 3 picks off a partial beam which, by means of the optic lens 10, produces light spots on the photoelectric receivers 8, 9. The two light spots correspond to the ordinary and extraordinary rays polarized vertically to each other, which are geometrically separated by the double-defractive plate 11 cut at an angle of 45° to the optical axis. The plate 11, effective with photoelectric receivers 8, 9 as an analyzer with push-pull outputs, converts the polarization modulation of the light into amplitude modulations. The differential amplifier 12 yield, as the reference signal, a pure A.C. signal which is applied to the electronic evaluation circuit 13 (differentiating stage and phase measuring stage). This signal corresponds to the light frequency-difference frequency $v_1 - v_2$. The measuring ray which has passed through the splitter 3 is converted by the mica $\lambda 14$ wave plate 5 from the right and left circularly polarized, complementary wave pair, into a complementary wave couple polarized in a linear, parallel, and vertical mode and having the light frequencies $v_1$ and $v_2$.

The quarter-wave plate is oriented with respect to the Wollaston prism 6 so that the parallel- and vertical-polarized wave couple are geometrically separated by the Wollaston prism in accordance with the splitting angle. The reflective component 7, e.g. a glass block, reflects the two partial beams with the planar outer surfaces so that the planar angle formed between a pair of homologous rays corresponds to the angular difference between the rays of the +1-st and −1-st order diffracted on the phase grid 4. Thus, the only illustrated pair of mutually vertically polarized beams is produced which are recombined in their direction. By a measuring movement of the phase grid, the light frequencies $v_1$ and $v_2$ are varied in accordance with the Doppler effect, so that the wave couple have the frequencies $v_1 + \Delta v$ and $v_2 - \Delta v$. The components 10'; 11'; 8'; 9'; 12' have an effect corresponding to the components associated with the reference beam. For this purpose, the plate 11' must be oriented, with its main directions of intersection, at an angle of 45° to the polarizing directions of the wave couple.

The measuring signal is compared in stage 13 according to frequency and phase with the reference signal. Counting pulses with the correct arithmetic sign control the forward-backward counter 14. In the case of stationary or slowly moving gratings, the indicator of the beat cycle fractions 15 yields a fine measurement on the basis of the phase difference between the pair of photoelectric signals.

Figure 2:
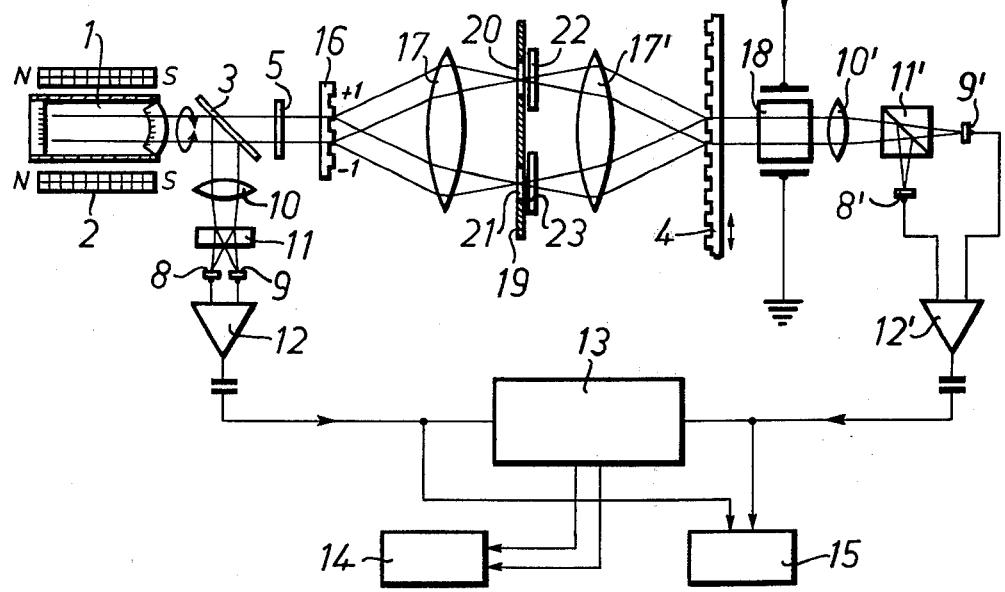
FIG. 2 shows a device for measuring in one coordinate direction with a parallel beam path and a position frequency stop.

In the modification shown in FIG. 2, corresponding reference numerals denote components which are analogous to the arrangement of FIG. 1. In this case, the quarter-wave plate 5 is followed, first of all, by a fixed phase grid 16 as the beam divider and this grid is disposed in the forward focal plane of a lens 17. The latter, together with a further lens 17', effects a telecentric 1 : 1 imaging of the grating 16 onto the grid 4. Between the lenses 17 and 17' and in the common focal plane thereof, a position frequency filter diaphragm 19 is disposed, the apertures 20,, 21 of which are provided with polarizing filters 22, 23 of crossed directions of transmission. The mutually crossed polarizing filters 22, 23 in the partial beams of the +1-st and −1-st orders of diffraction take care that, for each of the two directions of impingement on the grid 4, only one oscillation direction and thus only one light frequency become effective. The diaphragm apertures 20, 21 provide the tuning out of all undesired diffraction orders produced by the grating 16, which would lead to beams having Doppler frequency shifts which are not needed. A phase correction unit 18 is disposed between the movable phase grid 4 and the collecting optic lens 10', which makes it possible to shift the phase between the complementarily polarized beam proportions.

This device can consist, for example, of a Pockels cell 18 which, when a correction voltage is applied, effects an additional phase shift between the partial beams which have been rendered capable of interference at the polarizing splitter 11' oriented in the azimuth under 45°. The measured value emitted by the components 14 and 15 can quickly be influenced along the lines of correction within a small zone by variation of the Pockels cell voltage, without moving the measuring grid 4. The Pockels cell and the equivalent Kerr cell are disclosed in U.S. Pat. No. 3,736,526.

Figure 3:
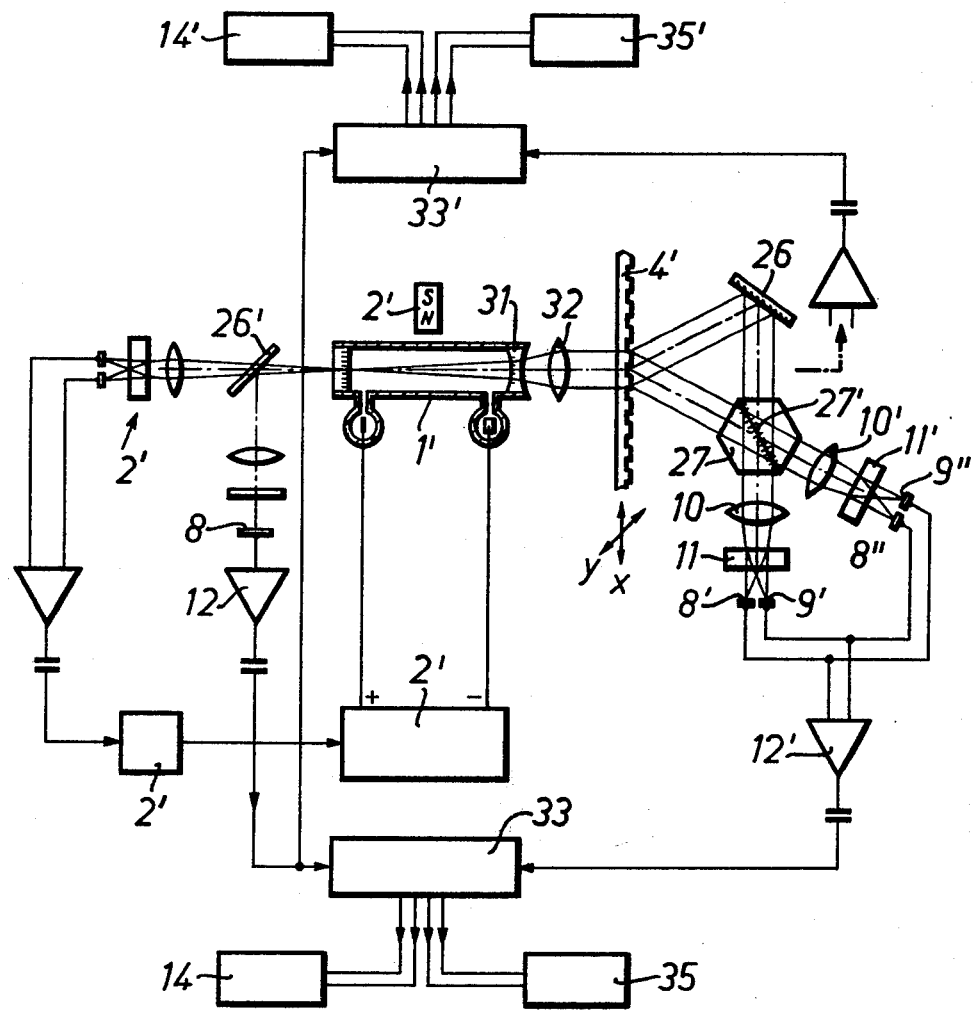
FIG. 3 shows a device for measuring in two coordinate directions.

FIG. 3 shows a device which measures in two coordinate directions. A polarization-isotropic laser resonator 1' has such a length that it can be excited to oscillate at most in two linear mutually vertically polarized modes of oscillations with several hundred megahertz frequency spacing in the $TEM_{001}$ mode. The length of the resonator is stabilized so that the two modes have the same intensity, which is effected by separation into polarizing directions, as well as by means of a differential photoelectric diode in a control loop. In order to branch off both components for a reference signal, a thin, unreflective (not silvered) glass plate 26' can be used, which is inclined under the Brewster angle with respect to the rearward laser beam and is oriented under 45° to the polarizing directions of the two modes in the angular position out of the plane of the drawing.

In order to render the directions of oscillation of the two modes fixed in space, a permanent magnet 2' is arranged beside the laser 1', the stray field of which is approximately at right angles to the resonator axis. The resonator mirror 31, acting as an aperture lens and dispersion lens forms, together with an objective 32, a beam expansion telescope, in order to ascertain the mean values with a sufficient beam cross section over a larger grating area. Forward-backward counters 14, 14' correspond to the function performed in FIGS. 1 and 2 while difference forming and phase measuring stages 33, 33' and beat fraction cycle indicators 35, 35' also correspond.

The cross grating 4', constructed as a phase grid with suppression of the 0-th order of diffraction, separates the illuminating beam ray into a larger number of diffraction orders, of which the four most intense rays of the 1-st 1-st diffraction orders are combined in pairs. Only one pair is illustrated in the plane of the drawing. The two other rays are disposed in a plane vertically to the drawing plane. The beam combining means 27 is a polarizing beamsplitting reflective layer 27', so that, in the two combined pairs of rays, respectively the vertically polarized components of the ± 1-st orders of diffraction of a coordinate are unified. Double-refractive plates 11, 11' are effective as polarizing splitters, which are oriented in the azimuth under 45° to the directions of oscillations, in order to enforce the interference of the pairs of rays in push-pull pairs. A push-pull amplifier 12' produces a combined measuring signal for the corresponding coordinate. With the use of the same reference signal, the position signals are produced in accordance with the measuring coordinates independently of each other, and further processed in measuring or position control circuits.

In order to process more readily the high carrier frequencies given by a two-mode laser, it is possible to transpose the reference and measuring signals with a common electric auxiliary oscillator by differential frequency formation in a modulator, for example into the intermediate frequency band of television technology which can easily be processed by commercial components.

Operating the photoelectric diodes with this auxiliary frequency results in the difference frequency formation between light modulation and auxiliary signal.

Figure 4:
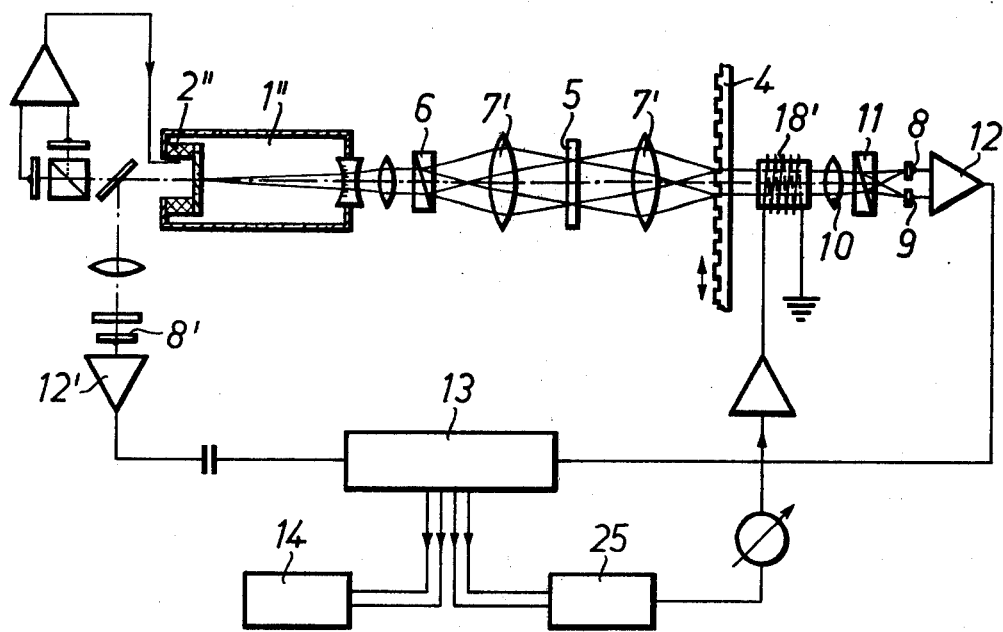
FIG. 4 shows a further device for measuring in one coordinate direction.

FIG. 4 shows another grating transducer for measuring in one coordinate direction. The laser 1'', serving as the source of illumination, is here provided with a length control circuit 2″ receiving its control variable from the light leaving the laser at the rear. From this light, as illustrated, the reference signal is likewise derived which is to be compared with the measuring signal. By means of a Wollaston prism 6, the main beam of the laser 1″ is split up into two components of orthogonal polarization, which components are combined on the grating by means of an afocal optic 7′ in correspondence with the diffraction angles of the grating 4. By means of a quarterwave plate 5 inserted in the afocal optic 7′, the orthogonal polarization states of the two beam components are converted into circular polarizations of opposite directions. Upon the movement of the grating 4 at an angle to its division lines, the partial beams which are combined into one direction at this grating and are in interference are subjected to a direction-dependent modulation of the alternating frequency of their light intensity. By means of an associated Faraday cell 18′, an optic lens 10, a polarizing beam splitter 11, a pair of photoelectric receivers 8, 9 and a differential amplifier 12, this light modulation is converted into electric signal modulation, as already described in connection with FIG. 2. Also the evaluation of these electric signals is already described above in connection with FIG. 2, except that in this case a beat phase meter 25 with zero adjustment is coordinated with the comparator 13 with forward-backward counter 14. This zero adjustment is effected from the beat phase meter 25 by controlling the Faraday cell 18′.

The gratings employed can have the form of linear gratings, cross gratings or radial gratings.

I claim:

1. In an optical method for measuring the relative displacement of a diffraction grating in its plane of division along at least one coordinate, with illumination of a grating by a light flux in a defined solid angle zone which is smaller than the corresponding angles of diffraction of the grating, and with evaluation of the partial light fluxes diffracted on the grating, the improvement comprising:
   a. projecting an illuminating beam with two approximately equally intensive polarization components, which are polarized complementary to each other and each has a differing light frequency and, producing an electric reference signal which is phase-correlated to the difference signal of these components;
   b. dividing the illuminating ray beam, by means of an optical component, into at least two mutually inclined partial beams, combining by means of a further optical component, at least two partial beams into at least one pair of parallel partial beams consisting of mutually complementary partial waves having different optical destinations wherein said diffraction grating is used as the dividing or combining component;
   c. forming as a measuring signal by means of photoelectric transducers from each pair of parallel, recombined, complementarily polarized partial beams of different frequency, the difference frequency, modulated by a displacement of the grating in accordance with phase and frequency, between the complementary partial beams, after the pair of partial beams has passed through a polarization analyzer; and
   d. comparing the reference signal and the measuring signal with each other in an electric comparison device, wherein the relative phase of the two signals is determined as a measure for the respective displacement component of the grating, and the number of beats is stored with the correct arithmetic sign in accordance with the sign of the difference frequency.

2. The method of claim 1, wherein a phase shift is produced between said partial beams of the measuring beam path.

3. The method of claim 1 further comprising producing an illuminating beam having a rotating linear polarization direction with the aid of a rotating polarizer, the illuminating beam consisting of complementary, circularly polarized partial waves having a difference frequency equal to twice the frequency of rotation of the polarizer.

4. In an apparatus for measuring the relative displacement of a diffraction grating (4) in its plane of division along at least one coordinate axis having illumination of a grating by a light flux in a given solid angle zone which is smaller than the corresponding given angles of diffraction of said grating and with evaluation of the partial light fluxes diffracted on said grating, the improvement comprising:
   a. a light source (1; 1′; 1″) having means for producing an illuminating ray beam having a beam path, said beam having first and second approximately equally intensive polarization components, said components polarized in complementation to each other and exhibiting differing light frequencies;
   b. means for splitting said beam path into an illuminating beam path and a reference beam path;
   c. a reference stage (8–12) locating along said reference beam path and producing an electric signal phase correlated with the difference signal of said first and second components;
   d. first optical component means (6, 16, 4′) for dividing said illuminating beam path into two mutually inclined partial beams;
   e. second optical component means (4, 27) located along said illuminating beam path for combining said partial beams into at least one pair of parallel partial beams consisting of mutually complementary partial waves having been subjected to differential optical influences, wherein one of said first and second optical component means is said diffraction grating (4) which is displaced relatively to said illuminating beam path;
   f. a polarization analyzer (11′) located along said illuminating beam path having output means associated with first photocells (8′, 9′); and
   g. said first photocells connected to an electric comparison unit (13).

5. The apparatus of claim 4, further comprising connected to said comparison unit, an indicating stage (15), storage means (14) and a servo circuit.

6. The apparatus of claim 4, wherein said light source is a laser with a polarization-isotropic resonator, oscillating in its single axial mode, the mode of oscillation of this laser being split, by an axial magnetic field, into two frequency-shifted, complementarily circularly polarized partial waves of identical direction.

7. The apparatus of claim 4, wherein said light source is a laser with a polarization-istropic resonator having dimensions so that only two axial, mutually vertically polarized modes of oscillation of differing frequencies contribute toward the light generation.

8. The apparatus of claim 4, wherein there is additionally provided in said beam path an externally controllable component means (18) which varies the phase relationship between said partial beams.

9. The apparatus of claim 4 for measuring in one coordinate direction, wherein said means for splitting is a beam splitter (3) is associated with a laser (1) comprising said light source and having a magnetic unit (2) for frequency splitting purposes, wherein said beam splitter (3) is followed along said illuminating beam path, in the direction toward a phase grid (4) effective as a measuring object, by a quarter-wave plate (5), the latter being followed, in front of said grid (4), by a beam-splitting polarizing component (6) and a beam-combining device (7); said grid (4) and a second exit surface of said splitter (3) are followed respectively one collecting optic (10, 10'), a polarizing splitter (11, 11'), and two photoelectric receivers (8, 9 and 8', 9'), the outputs of said receivers being connected to the inputs of respectively one differential amplifier (12, 12'); and wherein the outputs of said amplifiers (12, 12') are connected to a phase measuring unit (13), associated with a forward-backward counter (14), as well as a beat fraction meter (15).

10. The apparatus of claim 9 wherein said quarter-wave plate (5) is followed by a phase grating (16), an afocal optical lens-system (17, 17'), and said phase grid (4) is followed by a phase shifting unit (18), wherein, within said afocal optical lens-system (17, 17'), a position frequency filter diaphragm (19) is disposed with two apertures (20, 21) for the ± 1-st order of diffraction of said grating (16); and connected after said apertures (20, 21), are two polarizing filters (22, 23) with crossed transmission directions oriented with respect to said quarter-wave plate (5).

11. The apparatus of claim 4 wherein for measuring in one coordinate direction, said light source comprises a laser (1'') with a longitudinal control circuit (2''), being associated in the direction toward a phase grating (4) effective as a measuring object, with a beam-splitting, polarizing component (6) in the forward focal plane of a subsequent afocal optic (7'); a quarter-wave plate (5) oriented under 45° to the beam polarization directions is disposed in the parallel beam path of said afocal optic (7'); said grating (4) is arranged in the rear focal plane of said optic (7'); a Faraday cell (18') is connected after said grating (4) to serve as a beat phase controller; said Faraday cell (18') being followed by a collecting optic (10), a polarizing splitter (11), and two photoelectric receivers (8, 9), the outputs of which are connected to the inputs of a differential amplifier (12); said longitudinal control circuit (2''), for the production of a reference signal, is associated with a photoelectric receiver (8') and with an amplifier (12'); and the outputs of said amplifiers (12, 12') are connected with a comparator (13) after which are inserted a forward-backward counter (14), as well as a beat phase meter (25).

12. The apparatus of claim 4 for measurement in two coordinate directions, wherein said light source is a laser (1') having a frequency stabilizing system (2') associated on one side with a cross grating (4') effective as a measuring object, said cross grating (4') is associated in both of its beam splitting planes with respectively one beam-combining device consisting of a deflecting mirror (26) and a polarizing beam combining unit (27); the output channels of the beamcombining units (27) correlated with respectively one collecting optic (10, 10'), a polarizing splitter (11, 11'), and two photoelectric receivers (8', 9', 8'', 9''), the outputs of which are connected with inputs of a push-pull amplifier (12'); a glass plate (26') is associated with a second exit surface of said laser (1'), inclined at the Brewster angle with respect to the laser beam and at 45° with respect to the polarization directions, this glass plate being followed by a photoelectric receiver (8) with an amplifier (12) connected therewith; and outputs of the amplifiers (12, 12') are connected to an electronic evaluation stage (33, 33'), after which are connected a forward-backward counter (14, 14') and a phase meter (35. 35').

13. The apparatus of claim 12, wherein said cross grating is a cross phase grid with a half wave shift.

14. The apparatus of claim 13, wherein said cross grating has means for deflecting with preferred intensities, light only into respectively two coplanar orders of diffraction.

15. The apparatus of claim 9, wherein said polarizing component (6) is a Wollaston prism.

16. The apparatus of claim 9, wherein said polarizing component (6) is analogous double-refractive transversely slideable lens pairs.

17. The apparatus of claim 9, wherein said polarizing component (6) is a dielectric mirror surface separating linear polarization components.

18. The apparatus of claim 10, wherein said component effecting the directional changes (16) is a phase grid.

19. The apparatus of claim 10, wherein said component effecting the directional changes (16) is a partially transmissive mirror.

20. The apparatus of claim 10, wherein said component effecting the directional changes (16) is an amplitude grid.

* * * * *